Aug. 12, 1941.     W. F. THOMA     2,252,218
SEAT SLIDE STRUCTURE
Filed June 13, 1940
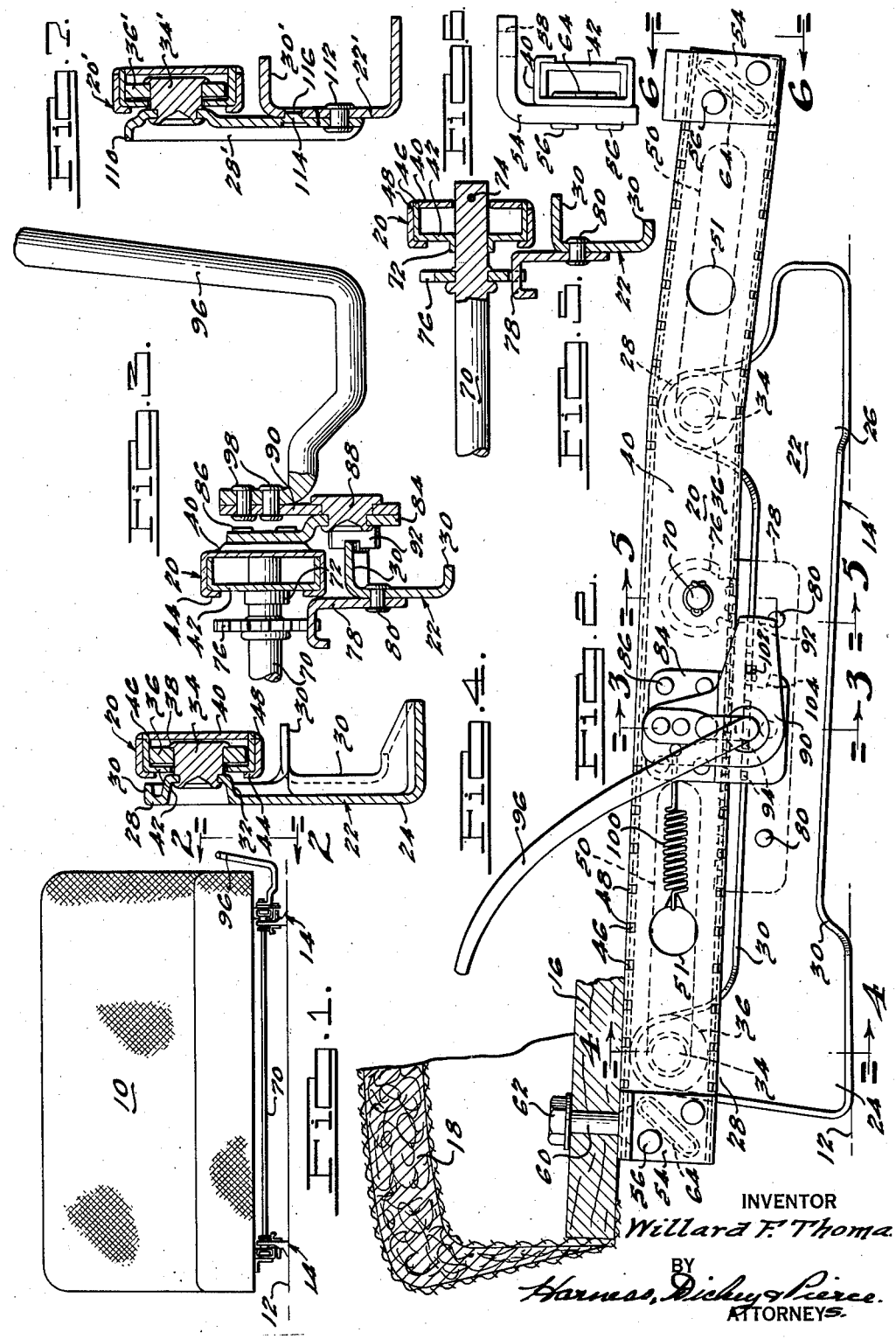
INVENTOR
*Willard F. Thoma*
BY
*Harness, Dickey & Pierce*
ATTORNEYS.

Patented Aug. 12, 1941

2,252,218

UNITED STATES PATENT OFFICE 2,252,218

SEAT SLIDE STRUCTURE

Willard F. Thoma, Detroit, Mich., assignor to National Stamping Company, Detroit, Mich., a corporation of Michigan Application June 13, 1940, Serial No. 340,340

8 Claims. (Cl. 155—14)

This invention relates to means for slidably supporting a seat whereby to permit adjustment in the position thereof, and is particularly applicable for use in connection with the driver's seat of an automobile whereby to permit the position of a driver with respect to the steering wheel and other control members to be readily adjusted.

Objects of the invention include the provision of a slidable seat supporting means that is simple in construction, efficient in operation and economical to produce; the provision of a slidable seat supporting means of such construction as to permit it to be constructed substantially entirely from stampings; the provision of a sliding seat support that is of unusually light construction embodying a minimum amount of material but at the same time is amply rigid for the purpose for which it is designed; the provision of a seat slide structure of the type described in which one of the relatively movable members is of tubular construction of novel design; the provision of a seat slide structure as above described including a pair of relatively movable parts one of which is tubular and the other of which carries a plurality of rollers lying within the tubular member; the provision of a construction as above described so constructed and arranged as to permit ready assembly of the relatively movable parts with respect to each other; and the provision of a construction as above described in which the weight of the seat and the person supported thereon is transmitted between the relatively movable parts through a roller located within a substantially tubular member and having substantial contact with both upper and lower walls of the tubular member.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views:

Fig. 1 is a front elevational view of a seat slidably supported for movement in a fore and aft direction by means constructed in accordance with the present invention;

Fig. 2 is an enlarged, partially broken, partially sectioned side elevational view taken on the line 2—2 of Fig. 1 and illustrating in greater detail the construction of the seat slide mechanism;

Fig. 3 is an enlarged transverse sectional view taken on the line 3—3 of Fig. 2;

Fig. 4 is an enlarged transverse sectional view taken on the line 4—4 of Fig. 2;

Fig. 5 is an enlarged transverse sectional view taken on the line 5—5 of Fig. 2;

Fig. 6 is a slightly enlarged end view of the seat slide member, taken looking in the direction of the arrows 6—6 of Fig. 2; and, Fig. 7 is a view similar to Fig. 4 but illustrating a modified form of construction.

Referring to the drawing and particularly to Fig. 1, a conventional seat is indicated generally at 10 of a type commonly employed as the front or driver's seat of an automobile. The seat 10 is supported upon the floor 12 by means of a pair of supporting devices indicated generally at 14, one positioned adjacent each side of the seat 10 and extending in approximate parallelism with respect to the corresponding sides thereof and in parallelism to each other. The supporting devices 14 are identical in construction except that one is righthanded and the other lefthanded, in other words some of the various parts and portions thereof are simply reversed in position from one another, and except that the righthand device 14, as viewed in Fig. 1, is provided with a latch mechanism not present on the lefthand device 14. Consequently a description of one of the supporting devices will suffice as a description of both of such devices and inasmuch as the righthand device 14 includes the latch mechanism this device will be described so as to also explain the construction and operation of the latch mechanism.

Referring to Fig. 2 it will be noted that the seat 10 includes a usual rigid seat bottom frame 16 and padded covering 18 and that the supporting device 14 is interposed between the frame 16 and floor 12. The supporting device 14 is formed of two main parts, namely the slide part indicated generally at 20 and the supporting part indicated generally at 22. Although the part 22 is shown secured to the floor 12 and the part 20 to the seat frame 16 it will be understood by those skilled in the art that the position of these parts may be reversed if desired, the changes required being relatively simple and readily apparent to those skilled in the art without further description.

In the construction shown the supporting part 22 is shown as constructed from a piece of sheet metal to the contour illustrated so as to provide a front foot 24 and a rear foot 26 together with upstanding front and rear arms 28. The metal around the entire perimeter of the support 22 is outwardly turned or flanged as at 30 to add rigidity to the structure as a whole, as well as to provide broad bases for the feet 24 and 26. Also it will be noted that the flange 30 at the upper side of the support 22 between the arms 28 is made relatively wide and is employed for an additional purpose which will hereinafter be more fully pointed out. The arms 28 are each acted upon as by a stamping or drawing operation to provide an outstanding boss 32 the outer face of which is outwardly spaced from the outer edge of the flange 30 immediately adjacent to it to provide suitable clearance for the seat slide 20. Each boss 32 is centrally apertured and has fixed therein one end of a shouldered pin 34 upon which is rotatably mounted a cylindrical roller 36, the pin 34 being provided with a head 38 limiting outward movement of the roller 36 thereon.

The slide 20 is a tubular member consisting of two sheet metal channel sectioned members 40 and 42 and, as particularly brought out in Fig. 2, the rear end portion thereof may be angularly offset downwardly with respect to the center line of the front portion thereof for the conventional purpose of increasing the lift of the rear portion of the seat as compared to the front portion thereof during sliding movement of the seat in a forwardly direction. The channel member 42 is of such vertical dimensions as to be closely received within the open side of the channel 40, as indicated, and the free marginal edges of the channel 40 are preferably turned inwardly over the opposite margins of the vertical wall of the channel member 42, as indicated at 44, for the purpose of securing the channel members in fixed relation with respect to each other. Although not necessary in all cases it is preferable from a manufacturing standpoint that the free marginal side edges of the channel member 42 be provided with a series of spaced outstanding lugs 46 thereon at various locations along the length of such edges and that the vertical wall of the channel member 40 be provided with openings 48 for reception of these lugs. The inter-engagement of the lugs 46 with the openings 48 not only aids in properly locating the channel 42 longitudinally with respect to the channel 40 but furthermore prevents the free edges of the horizontal walls of the channel member 42 from springing toward one another when the portions 44 of the channel member 40 are bent over the inner face of the channel member 42. It, therefore, provides a means for definitely determining the vertical distance between the free edges of the horizontal walls of the channel member 42.

The rollers 36 carried at the upper ends of the arms 28 are located within the tubular slide thus provided by the channel members 40 and 42, and the diameter of the rollers 36 is preferably such in relation to the vertical distance between the horizontal walls of the channel member 42 that the rollers 36 will bear the weight of the rails 20 by contact with the upper horizontal wall of the rail and extend into substantially contacting but slidable relation with respect to the lower horizontal wall of the rail 20. This provides for rolling support of the slide 20 and yet effectively eliminates relative vertical movement between the slide 20 and the support 22.

Reception of the rollers 36 in the slide 20 is accomplished by the provision of an elongated slot 50 in the inner wall of the slide 20, namely in the vertical wall of the channel member 42, in parallel relation to the upper and lower walls of the slide 20 adjacent each end thereof and of such dimensions as to permit the corresponding pin 34 to project therethrough. Thus during sidable movement of the slide 20 with respect to the support 22 the pins 34 move in the corresponding slots 50 and engagement of the pins 34 with the ends of the slots 50 serve to limit the slidable movement of the support 22 in both a forwardly and rearwardly direction. It may be noted from an inspection of Fig. 4 that while the length of the pin 34 is such as to substantially confine the vertical wall of the channel member 42 between the inner face of the roller 36 and the outer face of the boss 32, sufficient clearance is provided between the outer face of the boss 32 and the member 42, and sufficient clearance is provided between the ends of the rollers 36 and the inner side walls of the corresponding member 20, to allow the member 20 to swing laterally or torsionally about the rollers to take care of any misalignment in either the seat frame or floor panel.

For the purpose of permitting assembly of the rollers 36 and pins 34 to both the slide 20 and support 22, the slide 20 is provided with an opening 51 in the vertical wall of the channel member 40 thereof at points spaced longitudinally thereof corresponding with the distance between the axes of the rollers 36. The openings 51 are of a diameter slightly greater than the diameter of the heads 38 of the pins 34 so as to permit the pins 34 and the heads 38 thereof to be projected through the corresponding openings 51. In assembling the slide 20 to the support 22 the rollers are inserted in one or both ends of the slide 20 and moved into alignment with the corresponding opening 51 upon which the pins 34 are projected through the openings 51 and through the central opening in the corresponding roller 36 with the inner ends of the pins 34 projecting through the corresponding slots 50. The slide 20 with the pins and rollers thus positioned is then applied to the support 22, the inner ends of the pins 34 being projected through the openings in the respective bosses 32, upon which the inner ends of the pins 34 are headed over as illustrated in Fig. 4 to fix the pins 34 with respect to the support 22.

In order to facilitate securement of the slide 20 to the seat bottom frame 16, relatively heavy angle brackets 54 are preferably secured to the opposite ends of the slide 20 as by means of rivets 56, the brackets 54 each being provided with an opening 58 therein for reception of a bolt 60 which, as illustrated in Fig. 2, may extend upwardly through the frame 16 and receive a nut such as 62 on its upper end. In order to strengthen the wall of the channel member 40 to which the brackets 54 are secured over the area of securement thereto, the vertical wall of the channel member 42 is preferably embossed to provide a strengthening rib 64 therein extending angularly between the corresponding rivets 56 as best indicated in Figs. 2 and 6.

In order to insure the slide 20 of each of the devices 14 moving in unison longitudinally of the seat, a shaft 70 is extended between each slide 14 and its opposite ends are rotatably supported in the adjacent slide 20 as best indicated in Fig. 5. For this purpose the vertical wall of the channel member 42 is preferably outwardly flanged as at 72 about the opening provided therein for reception of the shaft 70. The extreme outer ends of the shaft 70 project through the vertical wall of the corresponding channel members 40 and a cotter or other pin 74 is extended through such projecting end to prevent axial movement of the shaft 70. Immediately inwardly of each of the slides 20 a pinion gear 76 is fixed to the shaft 70 and each pinion gear lies in mesh with an angularly sectioned sheet metal rack member 78 secured to the inner face of the corresponding support 22 by means of rivets 80.

In order to latch the slide 20 in longitudinally adjusted position upon the support 22 the following mechanism is provided. As best illustrated in Figs. 2 and 3 a plate-like bracket member 84 is fixed to the outer wall of the righthand supporting device 14, which constitutes the vertical wall of the channel member 40 thereof, by means of rivets 86. The bracket 84 projects downwardly below the lower edge of the slide 20 and adjacent its lower end has fixed thereto an outwardly projecting headed pin 88 upon which a plate-like latching member 90 of bell crank configuration is pivotally mounted. The latching member 90 has a rearwardly projecting leg or part the rear edge of which is inwardly turned as at 92 a sufficient amount to permit it to intersect the outer marginal edge of the flange 30 along the upper edge of the support 22 between the arms 28. This portion of the flange 30 is provided with a series of notches 94 in its outer edge in any one of which the end 92 of the latch member 90 may be received. An actuating handle 96 is fixed to the latch member 90 by means of rivets 98. A coil spring 100 maintained under tension between the upwardly projecting arm or portion of the latch member 90 and the forward opening 51 of the corresponding slide 20, constantly urges the latch member 90 in a counterclockwise direction of rotation as viewed in Fig. 2 so as to bring the end 92 thereof into engaged relation with respect to one of the notches 94 of the flange 30. Rotational movement of the latch member 90 in both a clockwise and counterclockwise direction of rotation as viewed in Fig. 2 is limited by means of an inwardly struck lug 102 on the latch member 90 which works in a notch 104 in the bracket 84. As will be appreciated when the end 92 of the latch member 90 is engaged in one of the notches 94 the slide 20 is locked against longitudinal movement with respect to the support 22. To release the latch 90 the operating handle 96 is manually operated to rotate the latch member 90 in a clockwise direction of rotation as viewed in Fig. 2, thus withdrawing the end 92 from the notch 94 in which it is then engaged, thus releasing the end 92 from operative engagement with the flange 30 and permitting the slide 20 to be adjusted longitudinally with respect to the support 22, the spring 100 re-establishing operative engagement of the end 92 with one of the notches 94 upon release of pressure on the operating handle 96.

It will be appreciated that it is not necessary to form the arms 28 as an integral part of the support 22 but that the same may be formed separately therefrom if desired and thereafter suitably fixed to the support. Such construction is illustrated in Fig. 7 which is a sectional view, corresponding to Fig. 4, taken through such modified construction. The construction being substantially identical except for the changes mentioned, the corresponding parts of Fig. 7 are illustrated by the same numerals as in the preceding figures except that such numerals bear a prime mark. The slide 20', pin 34' and roller 36' being identical to the same parts of the previously described construction require no further description. The support 22' in this case is identical to the support 22 previously described except that the integral arms 28 are dispensed with and the top flange 30' thereof may be extended in straight and unbroken condition from the front of the support to the rear end thereof. The arms 28' in this case are formed as separate stampings the perimetrical margins thereof being inwardly turned as at 110 in this instance to permit the flat outer face thereof to lie in flat contacting relationship with respect to the inner face of the vertical web of the support 22' as indicated. Rivets such as 112 may be employed for securing the arms 28' to the support 22' and, if desired, in addition parts of the arms 28' may be staked as at 114 into openings 116 provided therefor in the support 22' to further fix the arms in position upon the support. The construction illustrated in Fig. 7 will, of course, operate in identically the same manner as the construction in the previously described use.

Formal changes may be made in the specific embodiments of the invention described without departing from the spirit or substance of the broad invention, the scope of which is commensurate with the appended claims.

What is claimed is:

1. A seat slide structure comprising, in combination, a slide part comprising a pair of channel sectioned members arranged with their open sides opposed to each other and one received within the other to form a hollow structure, said channels arranged with their open sides facing horizontally and the vertical wall of one of said channels being slotted in parallel relationship with respect to the upper wall of said side, a pair of rollers within said slide, a support, and a pair of pins carried by said support projecting through said slotted wall and rotatably supporting said rollers thereon.

2. A seat slide structure comprising, in combination, a slide and a support, said slide comprising a pair of channel-sectioned members arranged with their open sides horizontally and opposed to one another and one of said channel members being received within the other thereof, the free marginal edges of said other of said channel members extending vertically over the margins of the vertical wall of the first mentioned channel member to secure such channel members against separation, one of said channel members having a plurality of slots extending longitudinally of and through the vertical wall thereof, rollers within said slide equal in number to said slots, and a pin extending through each of said slots operatively interconnecting each of said rollers with said supports.

3. The structure defined in claim 1 in which the first mentioned channel member is provided with a plurality of lugs projecting beyond the extreme marginal edge portion thereof, and said second mentioned channel member is provided with a plurality of openings through the vertical wall thereof receiving said lugs.

4. In an automobile seat slide structure, in combination, a supporting part comprising an elongated sheet metal member, a pair of upstanding arms on said member, and a laterally turned flange on said member between said arms, a tubular slide member, rollers received in said tubular slide member, pins fixed to said arms projecting through slots in the sides of said slide and rotatably receiving said rollers thereon, and a latch member carried by said slide and releasably engageable with said flange for the purpose of latching said slide against movement on said support.

5. A seat slide structure comprising, in combination, a slide comprising a pair of channel-sectioned members arranged with their open sides in opposed and horizontally directed relation, one of said channel members being received within and secured to the other of said channel-sectioned members to form a hollow structure, a pair of rollers received within said hollow structure, said rollers being of a diameter approximately equal to the vertical spacing between the horizontal surfaces of said tubular structure, a supporting member adapted to be fixed to a floor, a pair of upstanding arms on said supporting member, a laterally projecting pin fixed to each of said arms, said pins projecting through slots in one of said channel-sectioned members and each pin supporting one of said rollers, a flange integral with said supporting member and extending into parallel and spaced relation with respect to the lower wall of said slide below said lower wall, the free edge of said flange being notched, and the latch member carried by said slide and having an end releasably engageable with said notches whereby to latch said slide in longitudinally adjusted position relative to said support.

6. A seat slide structure comprising, in combination, a tubular slide having a plurality of slots in one side wall thereof, a fixed support, headed pins fixed to said support and each thereof projecting through a corresponding of said slots into the interior of said slide, a roller carried by each of said pins within said slide and in contact with the upper horizontal wall thereof, and said slide having an opening in that side wall thereof opposite said slotted side wall and in alignment with each of said slots and of sufficient size to pass one of said headed pins completely therethrough, whereby said rollers may first be positioned within said slide in alignment with said openings, said headed pins may be projected through said openings into said rollers and through said slots, and then be fixed to said support beyond said slotted side of said slide.

7. In a seat slide structure, in combination, a thin walled tubular slide member, a relatively thick angle shaped bracket having one leg thereof lying against a side face of said slide, vertically and horizontally spaced rivets securing said slide and bracket together, and a rib pressed out of said slide in that wall thereof fixed against said bracket and on the side thereof opposite said bracket extending diagonally between said rivets.

8. In a seat slide structure, in combination, a pair of elongated channel sectioned members arranged with their open sides horizontally and opposed to each other, one of said members being received in and secured to the other thereof to form a slide, a relatively thick angle shaped bracket having one leg thereof lying against a side face of said slide, vertically and horizontally spaced rivets securing said slide and bracket together, and a rib pressed out of said slide in that wall thereof fixed against said bracket and on the side thereof opposite said bracket extending diagonally between said rivets.

WILLARD F. THOMA.